(12) United States Patent
Bucknell et al.

(10) Patent No.: US 11,421,577 B2
(45) Date of Patent: Aug. 23, 2022

(54) EXHAUST HEADERS WITH INTEGRATED HEAT SHIELDING AND THERMAL SYPHONING

(71) Applicant: DIVERGENT TECHNOLOGIES, INC., Los Angeles, CA (US)

(72) Inventors: John Russell Bucknell, El Segundo, CA (US); Michael Vasile, Rancho Mirage, CA (US); Michael Bolton, Manhattan Beach, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/184,428

(22) Filed: Feb. 24, 2021

(65) Prior Publication Data

US 2021/0262379 A1    Aug. 26, 2021

Related U.S. Application Data

(60) Provisional application No. 62/981,329, filed on Feb. 25, 2020.

(51) Int. Cl.
*F01N 13/10* (2010.01)
*B33Y 80/00* (2015.01)
*F02B 37/02* (2006.01)

(52) U.S. Cl.
CPC ............ *F01N 13/102* (2013.01); *B33Y 80/00* (2014.12); *F02B 37/02* (2013.01)

(58) Field of Classification Search
CPC .......... F01N 13/102; F01N 3/043; F01N 3/02; F01N 13/08; F01N 13/18; B33Y 80/00;
(Continued)

(56) References Cited

U.S. PATENT DOCUMENTS 4,685,292 A * 8/1987 Brigham .................. F01N 3/06
                                                                 60/320
5,203,226 A    4/1993 Hongou et al.
(Continued)

FOREIGN PATENT DOCUMENTS

DE      4127634 A1 *  2/1993   ............. F01N 13/14
DE      4127634 A1    2/1993
(Continued)

OTHER PUBLICATIONS

US 9,202,136 B2, 12/2015, Schmidt et al. (withdrawn)
(Continued)

*Primary Examiner* — Devon C Kramer
*Assistant Examiner* — Kelsey L Stanek
(74) *Attorney, Agent, or Firm* — ArentFox Schiff LLP

(57) ABSTRACT

An exhaust header with an integrated heat shield is disclosed. In one aspect of the disclosure, the exhaust header comprises a body including an inner wall that defines a cavity through which exhaust gases can be routed. An outer wall is integrally formed with, and radially offset from, the inner wall to define an air gap through which an airflow can be received at an input of the exhaust header and passed along a periphery of the body to collect thermal radiation and route it through an outlet duct. In some embodiments, the exhaust header is coupled to a turbocharger, which itself is coupled to an exhaust outlet of the body and separately, the air gap for effecting an airflow about the turbocharger's perimeter. Further, in various embodiments, the exhaust header is additively manufactured to produce the integrated heat shield and other header components.

24 Claims, 4 Drawing Sheets

(58) Field of Classification Search
CPC ......... B33Y 10/00; B33Y 50/00; F02B 37/02;
G05B 19/4099
USPC ....... 60/605.1, 320, 321, 323; 165/159, 175,
165/179; 29/890.032, 890.08; 138/114,
138/148
See application file for complete search history.

(56) References Cited

U.S. PATENT DOCUMENTS

| | | | |
|---|---|---|---|
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,247,552 B1 * | 6/2001 | Kovar .................. | F01N 13/102 181/240 |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,397,589 B1 * | 6/2002 | Beson ..................... | F01N 3/046 60/320 |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |

(56) References Cited

U.S. PATENT DOCUMENTS

| | | |
|---|---|---|
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |

(56) References Cited

U.S. PATENT DOCUMENTS

| | | | |
|---|---|---|---|
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 10,801,380 B1* | 10/2020 | Sousley | G05B 19/4099 |
| 2004/0109759 A1* | 6/2004 | Korner | F01D 25/26 |
| | | | 415/205 |
| 2006/0108783 A1 | 5/2006 | Ni et al. | |
| 2009/0158724 A1 | 6/2009 | Muller | |
| 2013/0000299 A1 | 1/2013 | Badagharwala | |
| 2014/0277669 A1 | 9/2014 | Nardi et al. | |
| 2015/0300235 A1* | 10/2015 | Wegener | F01N 13/1872 |
| | | | 60/323 |
| 2017/0113344 A1 | 4/2017 | Schonberg | |
| 2017/0341309 A1 | 11/2017 | Piepenbrock et al. | |

FOREIGN PATENT DOCUMENTS

| | | |
|---|---|---|
| DE | 102014014846 A1 | 4/2015 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report issued in PCT/US2021/019626, dated Jun. 11, 2021.

* cited by examiner

EXHAUST HEADERS WITH INTEGRATED HEAT SHIELDING AND THERMAL SYPHONING

CROSS-REFERENCE TO RELATED APPLICATIONS

This application claims the benefit of, and right to priority to, U.S. provisional patent application No. 62/981,329, entitled "Exhaust Headers With Integrated Heat Shielding And Thermal Syphoning" filed Feb. 25, 2020, the contents of which are incorporated by reference as if expressly set forth herein.

BACKGROUND

Field

The present disclosure relates generally to vehicles, and more particularly, to exhaust headers used in automobiles and other transport structures.

Background

Vehicle exhaust headers may include one or more tubular or pipe-shaped assemblies for collecting exhaust gases from the cylinders and venting the gases, or for transporting the gases to other structures in the vehicle exhaust chain (e.g., muffler, catalytic converter, etc.). The exhaust header may include a collector to receive the gases from a manifold. In some cases, the exhaust header can be used to reduce a back pressure flow generated by the cylinders. In other cases, exhaust headers are simply used to vent the gases from the vehicle via exhaust pipes.

Exhaust headers emit thermal radiation due to the heat of the exhaust gases. The headers often require protective covering to avoid damaging sensitive vehicle parts in the surrounding areas. Thermal wraps are typically used for this purpose. Thermal wraps include a bundle of layers of protective heat-shielding material, with safety wires around the bundle to hold it in place on the body of the header. In addition to lacking aesthetic appeal, the resulting exhaust headers can be bulky and unwieldy owing to the additional step(s) of installing thermal wraps, can add vehicle mass and occupy internal space, can affect fuel economy, and can otherwise impede vehicle performance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure is generally directed to exhaust headers having integrally-formed heat shields. In various embodiments, the exhaust headers may be coupled to turbochargers or other structures for increasing engine performance. In some embodiments, the exhaust headers are coupled to thermal syphoning elements for venting heated air from the engine bay. In other embodiments, the exhaust headers are additively manufactured to enable flexible design and formation of the integrated heat shield, including using highly precise geometrical features where desirable.

In one aspect of the disclosure, an exhaust header includes a generally tubular body having an inner wall configured to transport exhaust gases through the body from an inlet to an outlet at different locations along the body, and an outer wall integrally formed over the body and radially offset from the inner wall, the inner and outer walls defining an air gap therebetween to reduce radial outflow of heat.

In another aspect of the disclosure, an exhaust header includes a body having an inner wall enclosing a first channel through which exhaust gases flow from a first inlet to a first outlet at different locations on the body, and an outer wall extending around, and offset from, the inner wall to integrally form a second channel, the second channel being narrower than the first channel, wherein the second channel is configured to receive an airflow at a second inlet adjacent one region of the body and to pass the airflow to a second outlet adjacent another region of the body.

In still another aspect of the disclosure, an exhaust header includes an at least partially elongated, bounded first surface forming a first channel through which exhaust gasses are configured to pass from a vehicle engine bay, and a second surface, offset from the first surface and integrally forming a second channel bounded at least in part by the first and second surfaces, the second channel passing an airflow by convection to transit heat out of the vehicle engine bay.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various aspects of exhaust headers with integrated heat shielding and thermal syphoning will now be presented in the detailed description by way of example, and not by way of limitation, in the accompanying drawings, wherein.

DETAILED DESCRIPTION

Figure 1:
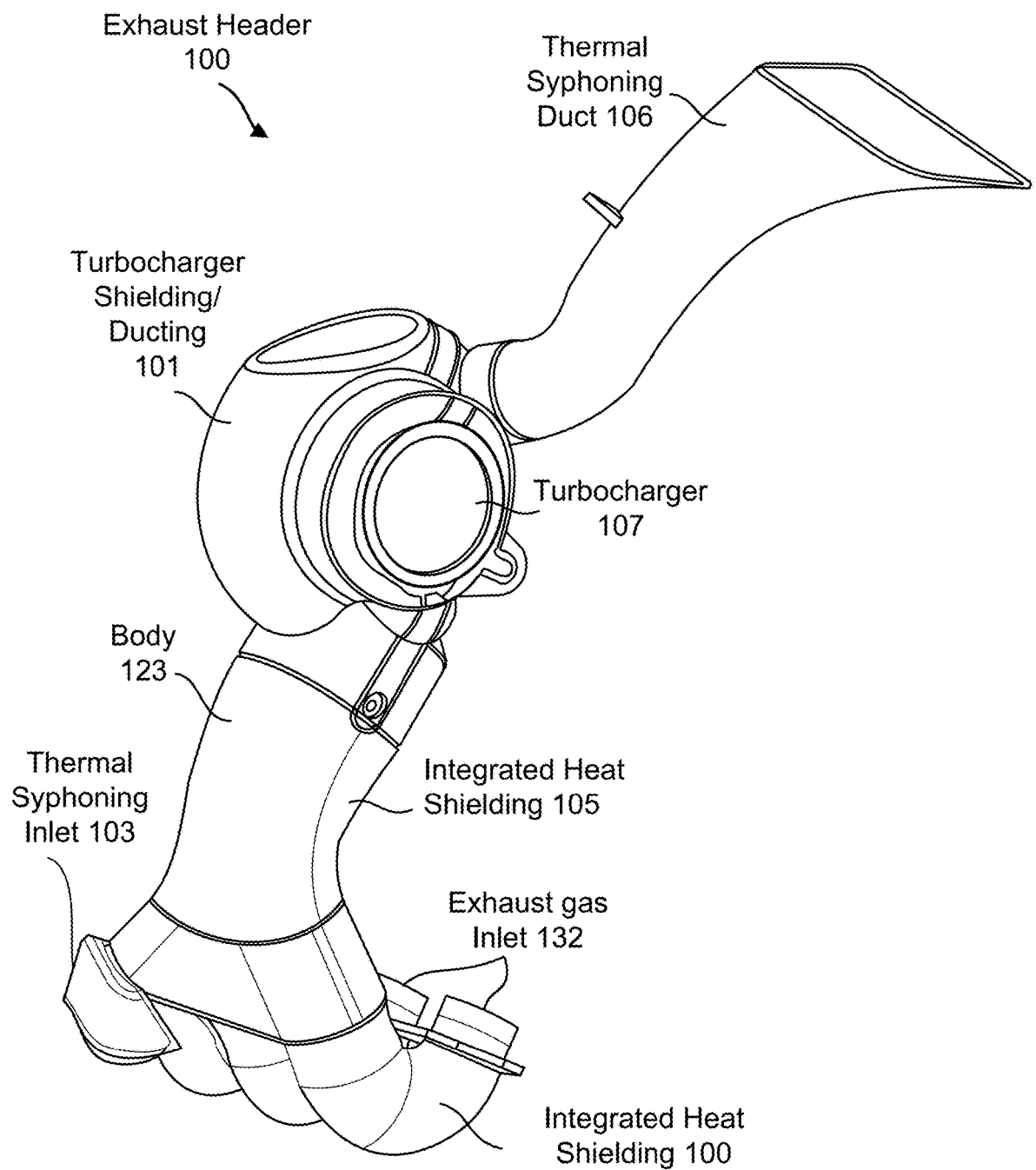
FIG. 1 is a perspective view of the exhaust header coupled to a turbocharger and a thermal syphoning duct.

The detailed description set forth below in connection with the appended drawings is intended to provide a description of various exemplary embodiments of the concepts disclosed herein and is not intended to represent the only embodiments in which the disclosure may be practiced. The terms "exemplary" and "example" used in this disclosure mean "serving as an example, instance, or illustration," and should not be construed as excluding other possible configurations or as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

The principles of this disclosure include an exhaust header having an integrated heat shield. In one aspect of the disclosure, the exhaust header is formed with a heat shield that is integrated with and radially offset slightly from the surface of the header body to form an air gap that extends across the surface and around the perimeter of the header. The offset amount may be uniform throughout, or it may vary along different regions or sections of the body. In another aspect of the disclosure, the exhaust header is additively manufactured to allow for formation of precise geometries, to enable the economic integration of the heat shield without requiring complex conventional techniques like machining, and to reduce or eliminate tedious welding requirements so often used to implement custom header designs. In some embodiments, small tabular-like supporting elements may extend longitudinally in a periodic or staggered fashion along an interior of the air gap to secure the heat shield, and to fix the position of the air gap to its necessary thickness(es) along the different regions of the body. In yet another aspect of the disclosure, the exhaust header is coupled to a thermal syphoning duct for venting the air in the air gap using convection to transfer heat from the exhaust gases to an external region away from sensitive vehicle components. Various additional embodiments of the exhaust header include the use of turbochargers coupled to the exhaust path to enhance engine performance.

Vehicles, for the purposes of this disclosure, are broadly intended to encompass any motorized transport apparatus, including without limitation automobiles of all types (coupes, sedans, etc.), minivans, vans, station wagons, sports utility vehicles, and trucks, as wells as commercial transport structures including buses, trains, and the like.

Conventionally-manufactured exhaust headers are either provided as a standard metallic tube or pipe, or in some cases as a sequence of such tubes, or as a manifold-based implementation incorporating a plurality of such tubes. These configurations may be angled to emit exhaust gases in a desired direction when implemented in a vehicle. Where specific angles not commercially available are required for an application, one or more standard pipes may be segmented and welded together into the desired shape. The latter process is time-consuming and labor intensive, at least because for such custom geometries, the welding operations must be repeated for each vehicle. Variations in precision may arise when relying on this technique.

As noted, conventional exhaust headers may emit significant heat due to the high temperatures of the exhaust gases, thereby requiring additional protective covering to avoid damaging internal vehicle parts in the proximity of these headers. The exhaust headers accordingly may require thermal wraps, which each include a plurality of layers of protective heat-shielding material, using safety wires around the circumference of the bundle to hold the layers of each header in place. The production of the layered exhaust header can add further time to the manufacturing process. The resulting exhaust header is also bulky, cumbersome, larger due to the thermal wraps, and lacks aesthetic design qualities. The wraps also add vehicle mass as well as potential structural or geometric irregularities the header, which may worsen as the wraps potentially shift over time. These factors make precise aerodynamic designs more difficult to achieve, affecting the vehicle's performance.

FIG. 1 is a perspective view of an exhaust header 100 according to an aspect of the disclosure. The exhaust header 100 is coupled to a turbocharger 107 and a thermal syphoning duct 106. The exhaust header 100 includes a body 123 defined in part by an inner wall (obscured from view in FIG. 1), around which integrated heat shielding 105 is formed. The heat shield 105 may be produced by integrally forming an outer wall over the body 123 and offsetting the outer wall by an amount appropriate for the design to include an air gap sandwiched in between the walls. The air gap can extend about a perimeter of the body 123 as an airflow passes through. The exhaust header 100 in various embodiments may include a thermal syphoning inlet 103 to allow air to flow through the air gap and ultimately to be routed out of the exhaust header by thermal syphoning duct 106. The heat shield and its constituent structures are described in more detail with reference to FIGS. 2-4.

In various embodiments, the exhaust header 100 may be coupled to a turbocharger 107. A turbocharger may generally include a small turbine and related components that sit between the engine and the exhaust. The exhaust header 100 may be advantageously configured to provide an exhaust input to the turbocharger 107 to enable the latter to provide the engine with a boosted airflow. Separately, the heat shielding 105 of the exhaust header 100 can be further integrated with the shielding/ducting 101 of the turbocharger 107 located about its periphery to provide a separate airflow for cooling the turbocharger 107. While the turbocharger 107 may in various embodiments respectively be plumbed to both the exhaust header and engine, it is noted that various conventional turbocharger components and connections are omitted from the illustration of FIG. 1 to avoid unduly obscuring the concepts of the disclosure.

In various embodiments, the exhaust headers 100 are additively manufactured (3-D printed), with the heat shielding being co-printed with the body of the exhaust header. The exhaust header 100 may be additively manufactured using Inconel, a Nickel alloy, for example. Other alloys or pure metallic substances may also be suitable in some configurations as print material. Further, in various embodiments, the exhaust header 100 can be co-printed with the thermal syphoning duct 106, or with turbocharger 107 or its housing, for example, in order to integrate the components compactly and efficiently, and to use custom geometries where desired.

Figure 2:
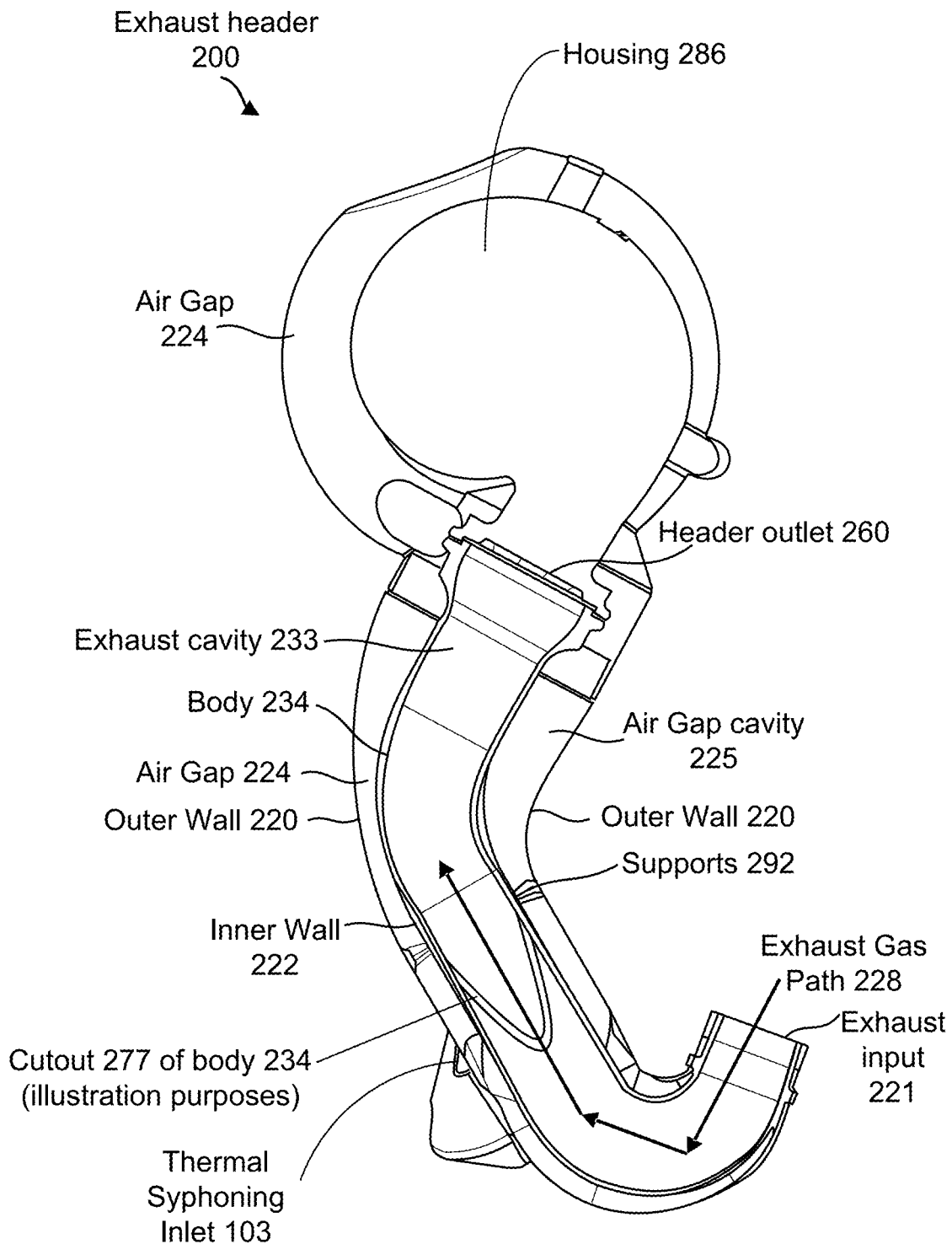
FIG. 2 is a side cross-sectional view of the exhaust header illustrating an example exhaust gas path.

FIG. 2 is a side cross-sectional view of the exhaust header 200 illustrating an example exhaust gas path 228 and an air gap cavity 225 separated by inner wall 222 and outer wall 220. In practice, and depending on design considerations, there may in some embodiments be multiple inner or outer walls. FIG. 2 includes a "cutout" 277 of the body 234, which exposes the exhaust cavity 233 for illustrative purposes. As shown by the bold arrows, exhaust gas path 228 flows from exhaust input 221 (which may include multiple inlets 132 as in FIG. 1) through the exhaust cavity 233, and through header outlet 260. While the header outlet 260 may be coupled to a turbocharger, in other embodiments the outlet may be coupled to another component in the exhaust path of the vehicle.

The precise geometry of the body 234 and the outer wall 220, and their relative positions, may vary depending on criteria like the relative thickness of the air gap 224 desired for different designs. For example, in the embodiment shown, the body 234 is generally tube-like, and the outer wall 220 is offset from the inner wall 222 to provide air gap cavity 225, which also may provide the exhaust header 200 with thermal radiation protection. In general, the air gap cavity 225 may be uniform in size across the body 234, or as here, the air cap cavity 225 may be larger in certain regions, and smaller in others. This variation in thickness of the air gap 224 across the exhaust header 200 may be used for addressing various engineering objectives, such as where it is desirable to design different airflows in different regions of the body 234, for example.

In other embodiments, however, the outer wall 220 may be constructed instead to conform more uniformly in shape with the inner wall 222, and to do so in some, most, or all circumferential regions of the body. The thickness of the air gap 224 may therefore vary depending on the design requirements for heat shielding, the need for a particular airflow for use in downstream components, or other factors that may be specific to the vehicle, the exhaust design, or both.

In some embodiments, supports 292 may be used between the outer wall 220 and inner wall 222 to stabilize the air gap cavity 225 and secure the offset between the walls. Supports 292 may be approximately tabular in nature as shown, rather than extending to surround the entire periphery of the body and thus blocking airflow in the air gap cavity 225. In other embodiments, where the outer wall 220 is positioned closer to the inner wall 222, smaller supports (not shown) may be used.

In various embodiments, using additive manufacturing, the inner and outer walls 222 and 220 can be formed using any appropriate geometry. As noted, the air gap cavity 225 may function as part of the heat shield and may also pass an airflow along the external portion of the body 234 to remove the heated air from the engine bay or other location.

Thermal syphoning inlet 103 can be seen at the lower portion of the exhaust header 200. The airflow enters the inlet 103 and passes along the periphery of body 234, receiving thermal radiation from the exhaust cavity 233 as the airflow moves along relative to the body 234. Near the top of FIG. 2, a housing 286 may optionally be installed within which a turbocharger or other exhaust gas component can be positioned. Air gap 224 may be extended up and around the housing 286, and the air from cavity 225 may be arranged to flow in one direction and exit at a designated point (e.g., FIG. 3). Thus, in this arrangement, a device arranged within housing 286 can receive the protective benefits of the airflow through the air gap cavity 225.

In various embodiments, exhaust header 200 including housing 286 may be additively manufactured as a single unit. In this case, the walls can be integrally formed to collect exhaust gas and a built-in radiation shield can route an airflow away from the engine bay. In still other embodiments, components of a turbocharger can be co-printed along with the header to combine the functionality of both components while using precise geometries that can minimize size and mass. Significant amounts of space can be saved where the need for wired bundles of protective covering as per the conventional technique can be eliminated.

Figure 3:
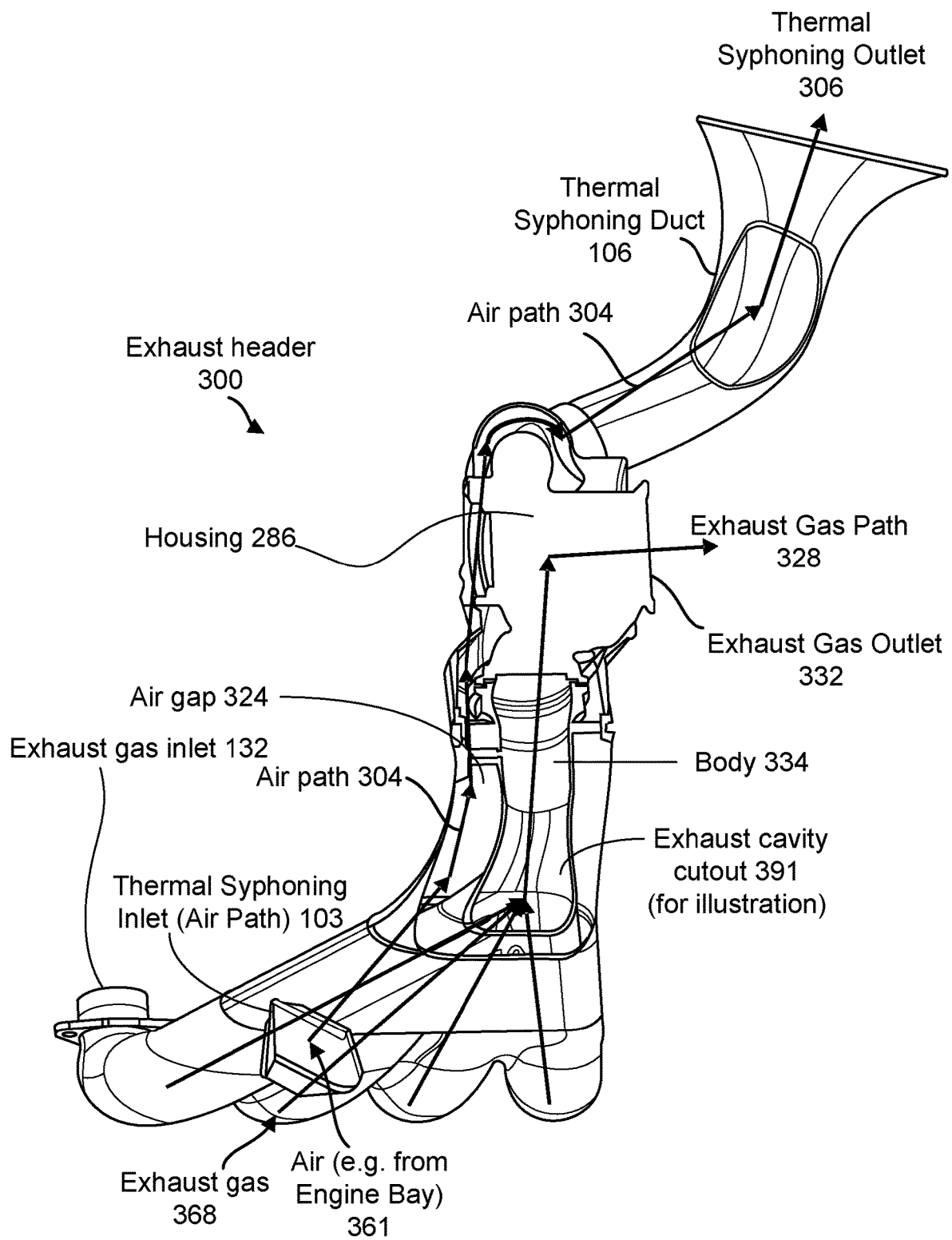
FIG. 3 is another perspective view of the exhaust header illustrating an example air path.

FIG. 3 is another perspective view of the exhaust header 300 illustrating an example air path 304 and an exhaust gas path 328. The exhaust header 300 of FIG. 3 is similar to FIG. 1, but is rotated in clockwise direction (into the page) such that now, a side view of the housing 286 is shown, and the thermal syphoning duct 106 is on the right of the image.

With initial reference to the lower portion of the header 300, thermal syphoning inlet 103 may be positioned to receive air 361 from the engine bay or another region where exhaust header 300 is positioned. The exhaust gas inlets 132 include four "fingers" in this embodiment. In an exemplary embodiment, each finger may be plumbed to a different cylinder of a four cylinder vehicle. In various embodiments, however, the architecture of exhaust gas inlets 132 may vary greatly to account for different factors such as the design of the manifold in use, the type of engine, and the like. In some embodiments to reduce size, exhaust gas inlets 132 may instead be configured to establish direct connections with each of the cylinders (or connections using minimal hardware), such that exhaust header 300 may also act as an exhaust manifold.

A first sequence of bold arrows illustrates an exhaust gas path 328 of the exhaust gases that entered inlets 132 and that are collected at the portion of the header shown by the exhaust cavity 391, a front portion of which is cut out for illustration purposes. In some embodiments, the header 300 can be positioned to reduce or eliminate a backflow of exhaust into the cylinders, such as by ensuring that each path through one of the exhaust gas inlets 132 is nearly equal in length where it is collected as shown in the exhaust cavity cutout 391 of body 334. There, the combined and collected exhaust gases can flow up through the body 334. Where a turbocharger is present, the exhaust gases can be used to spin a turbine of the turbocharger, or perform another function, before exiting out of the exhaust gas path 328.

With continued reference to FIG. 3, a thermal syphoning inlet 103 defines the beginning of an air path 304 through which air 361 can flow within the air gap 324 to remove heated air. In various embodiments, the heat-shielded exhaust header 300 may be coupled to a thermal syphoning duct 106 at an end portion of the air path 304. The thermal syphoning duct 106 includes a thermal syphoning outlet 306 through which the heated air in air gap 324 can be vented out of the vehicle. More specifically, the thermal energy from the hot exhaust gasses heats inner wall 222 (FIG. 2), which in turn heats the air in air gap 324. The heated air in air gap 224 may rise along air path 304 and escape through thermal syphoning outlet 306, thus drawing in relatively cooler air through thermal syphoning inlet 103. In this way, for example, relatively cooler air 361 can be drawn into air gap 324 during vehicle operation. The air path 304 can extend between the thermal syphoning inlet 103 and the thermal syphoning outlet 306. The thermal syphoning outlet 306 exhausts the hot air flowing through air gap 224 along air path 304 by the force of convection. The air path 304 from the engine bay 361 can further be channeled to flow past turbocharger 107 (FIG. 1) via turbocharger shielding/ducting 101, to help cool the turbocharger 107 as well.

Thus, the relatively cooler air from the engine bay 361 can be drawn into thermal syphoning inlet 103 by the convection of air. Thermal syphoning duct 106 can receive the airflow and effectively syphon heat from both the exhaust header 100 and the turbocharger 107. Controlled convection of the header surface, kept segregated from the rest of the engine bay, is not possible using conventional thermal wrapping technology.

Figure 4:
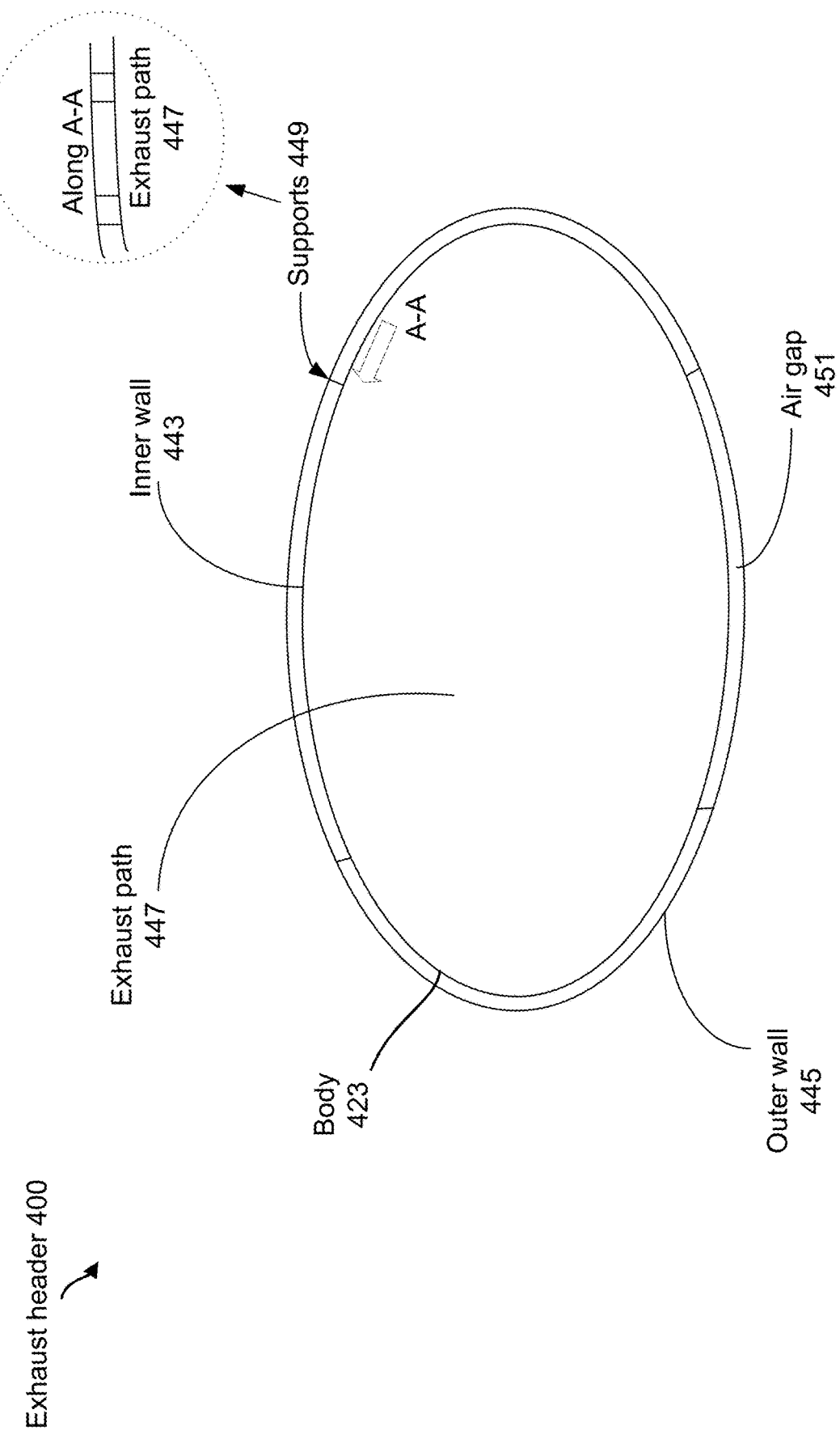
FIG. 4 is a cross-sectional view of the exhaust header illustrating the integrally-formed outer wall offset from the inner wall to form the heat shield.

FIG. 4 is a cross-sectional view of the exhaust header 400 illustrating the integrally-formed outer wall 445 offset from the inner wall 443 to form the heat shield. FIG. 4 illustrates a body 423 of the exhaust header generally defined by inner wall 443 enclosing exhaust path 447, which flows into (or out of) the page. The outer wall 445 is integrally formed with, and offset from, the inner wall 443 to form the air gap 451. To secure the heat shield, supports 449 may be strategically positioned between the inner and outer walls 443 and 445. As shown in 447, the support 449 is illustrated in a direction of the arrow A-A, which shows just a small exemplary segment of the structure between the inner and outer walls. The two supports shown in 447 are tubular rather than continuous in nature, and therefore they can allow airflow around the perimeter of the exhaust header 400 with minimal interruption to the circulating airflow. Meanwhile, structural integrity of the integrated heat shield can be maintained permanently, without the shifts that may be associated with wired thermal wraps.

As noted, the heat-shielded exhaust header can be additively manufactured, with the outer wall being co-printed with the remaining components of the exhaust header in a single print job. Co-printing increases manufacturing efficiency and allows for virtually unlimited customization of the design to fit any necessary geometry and size.

The previous description is provided to enable any person skilled in the art to practice the various aspects described herein. Various modifications to these exemplary embodiments presented throughout this disclosure will be readily apparent to those skilled in the art. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An exhaust header, comprising:
   a tubular body having an inner wall configured to transport exhaust gases through the body from an inlet to an outlet at different locations along the body;
   an outer wall integrally formed over the tubular body and radially offset from the inner wall, the inner and outer walls defining an air gap therebetween; and
   a turbocharger coupled to the outlet to receive the exhaust gases, the turbocharger having an air duct formed thereover for receiving an airflow from the air gap to reduce radial heat outflow.

2. The exhaust header of claim 1, wherein the outer wall is shaped at least in some regions of the tubular body to conform with the inner wall.

3. The exhaust header of claim 1, wherein the tubular body is additively manufactured, the outer wall being co-printed with the inner wall.

4. The exhaust header of claim 1, wherein the tubular body comprises a nickel alloy.

5. The exhaust header of claim 1, further comprising:
   a second inlet adjacent one end of the tubular body and arranged on the outer wall; and
   a second outlet adjacent another end of the tubular body, wherein the second inlet and the second outlet are configured to provide an airflow passing through the air gap.

6. The exhaust header of claim 5, wherein the outer wall is thinner than the inner wall.

7. The exhaust header of claim 5, wherein a width of the air gap is configured to enable the passing airflow to syphon heat from the exhaust gas and exit the second outlet.

8. The exhaust header of claim 7, wherein the second outlet comprises a thermal syphoning duct configured to direct the heated airflow from an engine bay.

9. The exhaust header of claim 5, wherein the radial offset is configured to vary over different regions of the tubular body.

10. The exhaust header of claim 1, wherein:
    the inner wall is coupled to an input of the turbocharger; and
    the outer wall is integrally formed over a surface of the turbocharger to enable the air gap to extend across the turbocharger surface.

11. An exhaust header, comprising:
    a body having an inner wall enclosing a first channel through which exhaust gases flow from a first inlet to a first outlet at different locations on the body; and
    an outer wall extending around, and offset from, the inner wall to integrally form a second channel, the second channel configured to receive an airflow at a second inlet adjacent one region of the body and to pass the airflow to a second outlet adjacent another region of the body; and
    a turbocharger coupled to the first outlet to receive the exhaust gases, the turbocharger having an air duct formed thereover for passing the airflow from the second outlet across the turbocharger to reduce radial heat outflow.

12. The exhaust header of claim 11, wherein the outer wall is thinner than the inner wall.

13. The exhaust header of claim 11, wherein the outer wall is offset by at most fifteen (15) millimeters from the inner wall.

14. The exhaust header of claim 11, wherein a thickness of the second channel is spaced to allow the passing airflow to absorb heat from the inner wall of the body before exiting through the second outlet.

15. The exhaust header of claim 11, being a three-dimensional (3D) printed exhaust header.

16. The exhaust header of claim 11, wherein the body comprises a Nickel alloy.

17. The exhaust header of claim 11, further comprising a thermal syphoning duct coupled to the second outlet.

18. The exhaust header of claim 11, wherein the turbocharger includes a turbocharger body, a surface of the turbocharger body having an aperture to receive the exhaust gases at the first outlet.

19. The exhaust header of claim 18, wherein the turbocharger includes a turbocharger duct extending at least in part around the turbocharger body, the turbocharger duct receiving the airflow from the second outlet and directing an airflow around the turbocharger body to a duct outlet.

20. The exhaust header of claim 19, further comprising a thermal syphoning duct coupled to the turbocharger duct.

21. An exhaust header, comprising:
    an at least partially elongated, bounded first surface forming a first channel through which exhaust gases are configured to pass from a vehicle engine bay;
    a second surface, offset from the first surface and integrally forming a second channel bounded at least in part by the first and second surfaces, the second channel passing an airflow by convection to syphon heat out of the vehicle engine bay; and
    a turbocharger coupled to the first channel to receive the exhaust gases, the turbocharger having an air duct formed thereover for receiving an airflow from the second channel to reduce radial heat outflow.

22. The exhaust header of claim 21, wherein the airflow inhibits thermal radiation from the first channel to an area surrounding the exhaust header by absorbing heat from the first surface.

23. The exhaust header of claim 21, wherein the first and second surfaces are formed using additive manufacturing.

24. The exhaust header of claim 21, further comprising a plurality of supports disposed between the first and second surfaces.

\* \* \* \* \*